A. S. HOWELL.
FOCUSING DEVICE FOR CAMERA LENSES.
APPLICATION FILED SEPT. 20, 1920.
1,417,527. Patented May 30, 1922.
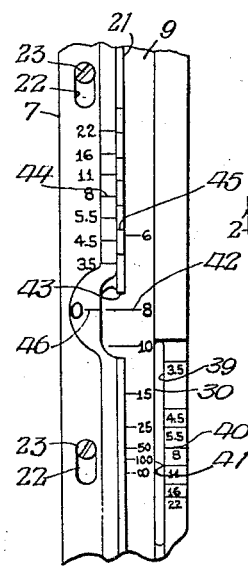
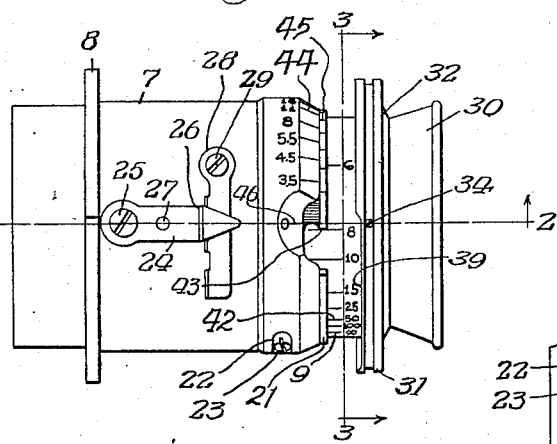
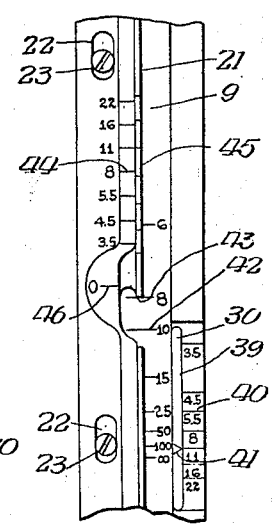
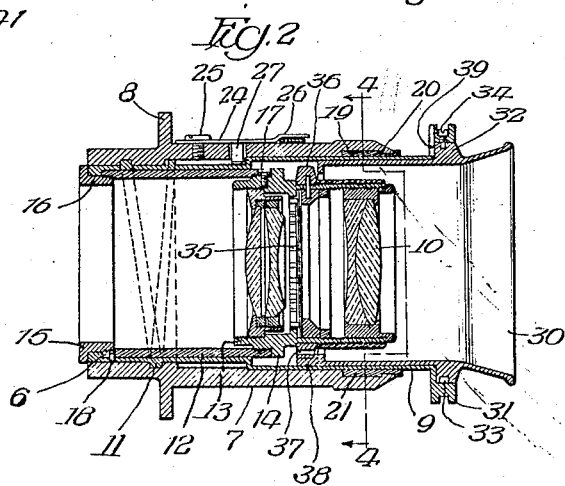
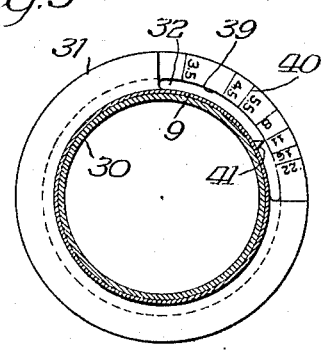
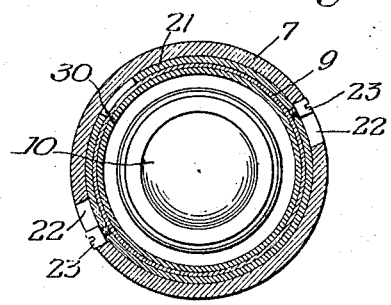
Inventor
Albert S. Howell
By Miehle & Miehle Attys.

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

FOCUSING DEVICE FOR CAMERA LENSES.

1,417,527. Specification of Letters Patent. Patented May 30, 1922.

Application filed September 20, 1920. Serial No. 411,514.

*To all whom it may concern:*

Be it known that I, ALBERT S. HOWELL, a citizen of the United States, residing at Chicago, in the county of Cook and State of Illinois, have invented a certain new and useful Improvement in Focusing Devices for Camera Lenses, of which the following is a full, clear, concise, and exact description, reference being had to the accompanying drawings, forming a part of this specification.

My invention relates to focusing devices for camera lenses and relates particularly to such a device for camera lenses of motion picture cameras although not limited to this use alone.

I have found that the adjustment of the iris diaphragm device has an effect upon the focus of the lens, that is, the focal adjustment of the lens along its axis which is correct when the iris diaphragm device is wide open is not correct when the iris diaphragm device is partially closed for the focusing of the lens upon an object at a given distance from the camera, and that as the iris diaphragm is closed the distance between the lens and the sensitized plate or film should be increased to effect an accurate focus of the lens in the several adjustments of the diaphragm. The main feature of my invention resides in the provisions of means whereby the adjustment of the focus of the lens both with relation to the distance between objects to be focused and the camera and with relation to the adjustment of the iris diaphragm device may be predetermined to permit such focal adjustment of the lens accurately and quickly.

With this feature in view my invention consists in certain features of novelty in the construction, combination, and arrangement of parts by which the said feature and certain other features hereinafter appearing are effected, all as fully described with reference to the accompanying drawings and more particularly pointed out in the claims.

In the said drawings—

Figure 1 is a view in side elevation of a camera lens assembly embodying my invention in its preferred form.

Figure 2 is a central horizontal section on the line 2—2 of Figure 1.

Figure 3 is a vertical section on the line 3—3 of Figure 1.

Figure 4 is a vertical section on the line 4—4 of Figure 2.

Figures 5 and 6 are diagrammatical views of the preferred form of an indexing device of the invention, showing the elements thereof in various positions.

Like characters of reference indicate like parts in the various views.

In the drawings 7 designates a support element which is tubular in structure and is provided with an external circumferential flange 8 by means of which the same may be easily secured to a camera casing. A second tubular element 9, in which a camera lens 10 is mounted, as hereinafter described, has external screw-threads formed on the outer surface at the rearward end thereof, which screw-threads engage corresponding internal screw-threads formed on the inner surface of the tube 7 at the rearward end thereof, as designated at 11. The lens 10 is secured within the tube 9 by means of an internally threaded bush 12 screw-threaded upon the rear end of the lens body 13 against the usual flange 14 of this body and extending rearwardly therefrom and an externally flanged clamp ring 15 screw-threaded into the rear end of the bush 12 and having its flange engaging the rear surface of an internal rib 16 formed on the tube 9, and clamping the rear end of the bush 12 against the front surface of this rib. See Fig. 2. A headed screw 17 is disposed radially in a countersunk hole in the bush 12 and is screw-threaded into the lens body 13 to maintain the lens body and bush in proper relation, and a radially disposed pin 18 is secured in the tube 9 immediately in front of the internal rib 16 and extends inwardly and engages a slot 6 in the bush 12, extending longitudinally of the bush from the rear end thereof, to maintain the bush and tube 9 in proper relation. The screw-threaded engagement of the tubes 7 and 9 provides a focal adjustment for the lens 10 and the screw-threads 11 are preferably of such a pitch that the several focal adjustments of the lens are made within one revolution of the tube 9 with relation to the tube 7. The forward end of the tube 7 is internally grooved coaxially with the axis of rotation of the tube 9, as designated at 19, and the portion of this tube between the groove and forward end of the tube, as designated at 20, is somewhat larger in internal diameter than the main portion of the bore of this tube rearward of the groove 19, this leaving a space between the portion 20 of the tube 7 and the tube 9. Mounted for pivotal movement within the groove 19 on an axis coaxial with the axis of rotation of the tube 9 is a split resilient expansion ring 21, which extends forwardly of the front end of the tube 7 and has an external groove engaged with the portion 20 of the tube 7, the portion of this ring in line with the portion 20 of tube 7 occupying the space between the portion 20 and tube 9. The interengagement of the shoulders formed by the grooves of the tube 7 and ring 21 provides for end thrust of the ring relatively to the tube. The ring 21 expands against the tube 7 and is assembled therein before the tube 9 is mounted in the tube by contracting the ring and then allowing it to expand against the tube 7 into its assembled position therewith. The resilient expanding nature of the ring 21 provides a frictional engagement between the ring and tube 7 and functions to maintain the same in its adjusted position therewith. The internal diameter of the ring 21 is such that the tube 9 will rotate freely with relation thereto. The portion of the tube 7 in line with the groove 19 is provided with two diametrically opposite circumferentially extending slots 22 in which are engaged the heads of respective diametrically disposed screws 23 screw-threaded into the ring 21. See Figs. 1 and 4. These screws by engagement in the slots limit the pivotal movement of the ring and their heads project slightly above the external surface of the tube 7 to permit the convenient manipulation of the ring in its pivotal movement.

Mounted on the outer surface of the tube 7 forward of the flange 8 is a spring blade 24 which extends longitudinally of the tube and is secured thereto at its rearward end by a headed screw 25. See Figs. 1 and 2. The forward end of this blade is offset away from the tube forming a surface 26 slanting outwardly from the tube and away from the rearward portion of the blade. Secured to the blade 24 intermediate its ends is a pin 27 which extends inwardly through an aperture in the tube 7 to engage the tube 9 to provide a frictional engagement between these tubes to prevent accidental movement of the tube 9 within tube 7. This frictional engagement may be broken to permit the easy removal of tube 9 within tube 7 by a blade 28 pivotally secured to tube 7 by means of a headed screw 29 and having its intermediate portion underlying the offset portion of the blade 24 and having the edge thereof facing portion 26 of the blade 24 beveled to engage the portion 26 and raise the intermediate portion of the blade 24 away from the tube 7 when the blade 28 is moved to move the beveled edge thereof against the portion 26 of the blade 24. This actuation lifts the pin 27 out of engagement with the tube 9 to permit the easy removal thereof from the tube 7.

The forward end of the tube 7 is enlarged to accommodate front portion of tube 9 which is enlarged to receive a third tube 30, which is rotatably mounted within the tube 9. The extreme forward end of the tube 9 is externally enlarged, as designated at 31, forming a rearwardly facing shoulder, and this portion of the bore of tube 9 is enlarged accordingly forming a forwardly facing shoulder in the bore. The tube 30 is externally enlarged adjacent its forward end, as designated at 32, forming a rearwardly facing shoulder. This enlarged portion 32 of the tube lies within the enlarged portion of the bore of tube 9 within the enlarged portion 31 of the tube and has a circumference groove 33 therein which is engaged by a radially disposed screw 34 screw-threaded into the enlarged portion 31 of the tube 9 and engaging the groove 33 to retain the tube 30 within the tube 9. The lens 10 is provided with a usual adjustable iris diaphragm device 35 which is controlled by an adjustment ring 36 mounted for limited rotation on the lens body 13. The ring 36 is provided with a longitudinal slot 37, which is engaged by a rearwardly projecting lug 38 formed on the rear end of the tube 30 to provide an operative connection between the ring 36 and tube 30 whereby the adjustment of the iris diaphragm device may be effected by rotatory movement of the tube 30 within tube 9.

An opening 39 is formed in the rearwardly facing shoulder of the enlarged portion 31 of the tube 9, this leaving a portion of the rearwardly facing shoulder of the enlarged portion 32 of the tube 30 exposed. See Figs. 1, 2, and 3. An indexing device is provided for the iris diaphragm device to indicate predetermined adjustments of the same, which indexing device comprises a scale 40 placed on the rearwardly facing surface of the enlarged portion 31 of tube 9 at the opening 39 and a mark 41 placed on the portion of the rearwardly facing shoulder of the enlarged portion 32 of tube 30 which is exposed by the opening 39 in the various adjustments of the tube 30 relatively to tube 9. See Fig. 3. This arrangement of the indexing device permits the same being viewed from a point at the rear of the forward end of the tubes, and is a particularly convenient arrangement in the use of my invention as hereinafter set forth.

A scale 42 is placed on the portion of the tube 9 immediately in front of the forward end of the tube 7 and extends in the direction of rotation of tube 9. This scale cooperates with an end 43 of the split ring 21 to form an indexing device. This indexing device is adapted to indicate, when the split ring 21 is properly adjusted with the tube 7, predetermined adjustments of the tube 9 with the tube 7, and accordingly predetermined adjustments of the lens 10, in accordance with the distances between the objects to be focused and the support tube 7. A scale 44 is placed on the extreme forward end of the tube 7 and cooperates with a scale 45 placed on the exposed circumferential portion of the split ring 21. The scale 44 and scale 45 extend in the direction of pivotal movement of the ring 21 and cooperate to translate the adjustments of the iris diaphragm device as indicated by the indexing device thereof to indicate predetermined adjustments of the ring 36 relatively to the tube 7 to cooperate with the indexing device comprising the scale 42 and the end 43 of the ring to predetermine the focal adjustments of the tube 9 relatively to the support tube 7, and accordingly the lens 10 relatively to tube 7, to predetermine the adjustments of the lens 10 relatively to the support tube 7 both with relation to the adjustments of the iris diaphragm device and with relation to the distances between the objects focused and the support tube 7. The indexing device comprising scales 44 and 45 is of the vernier type for the reason that the translated adjustments of the iris diaphragm device are relatively slight and an ordinary scale and mark would be somewhat confusing because the marks of the scale would necessarily be very close together. The scale 44 comprises a number of spaced marks corresponding in number to the number of marks in the scale 40 and having like characters arranged in similar order. The scale 45 comprises the same number of spaced marks as does the scale 44, and each mark of the scale 45 is adapted to be registered with a respective mark of the scale 44 in the movement of the ring 21. Each mark of the scale 45 is so positioned relatively to the end 43 of the ring 21 that when it is registered with the respective mark of the scale 44 the end 43 is disposed so that the scale 42 cooperating with the end 43 predetermines the focal adjustment of the lens relatively to the distances between objects to be focused and the tube 7 in accordance with the indicated adjustment of the iris diaphragm device. Thus in Figure 6 the indicated adjustment of the iris diaphragm device is indicated by the character 11 of the scale 40. The ring 21 is therefore adjusted so that the respective mark of the scale 45 registers with the mark of the scale 44 opposite the character 11 thereof, and the tube 9 is adjusted so that the proper mark of the scale 42 registers with the end 43, it being the mark indicated by the character 8 in said Fig. 6. Fig. 5 shows the ring 21 adjusted at one end of its movement where it allows the scale 42 to cooperate with a usual mark 46 formed at a cut away portion at the forward end of the tube 7, which mark may be used to cooperate with the said scale 42 when it is desired not to predetermine the focal adjustment of the tube lens with relation to the adjustment of the iris diaphragm device.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. A device of the nature described including a camera lens, a support therefor adapted to permit movement of the lens relatively thereto longitudinally of the axis of the lens to permit the focusing of the lens, an adjustable iris diaphragm device for the lens, an indexing device adapted to indicate predetermined adjustments of the iris diaphragm device, and an indexing device adapted to indicate predetermined focal adjustments of the lens relatively to said support both with relation to the distance between objects to be focused and the support and with relation to the adjustment of the iris device.

2. A device of the nature described including a camera lens, a support therefor adapted to permit movement of the lens relatively thereto longitudinally of the axis of the lens to permit the focusing of the lens, an adjustable iris diaphragm device for the lens, an indexing device adapted to indicate predetermined adjustments of the iris diaphragm device, and an indexing device adapted to indicate predetermined focal adjustments of the lens relatively to the support and longitudinally of the axis of the lens with relation to the distance between the support and objects to be focused and adapted to indicate predetermined variations in said predetermined focal adjustments in accordance with the adjustment of the iris diaphragm device.

3. A device of the nature described including a camera lens, a support therefor adapted to permit movement of the lens relatively thereto longitudinally of the axis of the lens to permit the focusing of the lens, an adjustable iris diaphragm device for the lens, an indexing device adapted to indicate predetermined adjustments of the iris diaphragm device, and an indexing device for indicating predetermined focal adjustments of the lens relatively to the support including an index member movable independently of said support and lens, an index device adapted to indicate predetermined relative positions between said lens and index member and a second index device adapted to indicate predetermined relative positions between said movable index member and the support, said two last mentioned index devices and said movable index member being adapted to cooperate to indicate predetermined focal adjustments of the lens relatively to said support both with relation to the distance between objects to be focused and the lens and with relation to the adjustments of the iris diaphragm device as indicated by said first mentioned indexing device.

4. A device of the nature described including a camera lens element, a support element therefor adapted to permit movement of the lens element relatively thereto longitudinally of the axis of the lens element to permit the focusing of the lens element, an adjustable iris diaphragm device for the lens element; an indexing device adapted to indicate predetermined adjustments of the iris diaphragm device, and an indexing device for indicating predetermined focal adjustments of the lens relatively to the support element including an index member movable independently of the lens and support elements and a scale device indicating predetermined adjustments between said index member and one of said elements, said index member being adapted to be positioned relatively to the other element in such independent movement in accordance with the adjustments of said iris diaphragm device to translate such adjustments to indicate with said scale device predetermined focal adjustments of the lens element in accordance with adjustments of the iris diaphragm device and said scale device being adapted to indicate with said adjusted positions of the index member predetermined focal adjustments of the lens element in accordance with the distances between the objects to be focused and the support element.

5. A device of the nature described including a camera lens element; a support element therefor adapted to permit movement of the lens element relatively thereto longitudinally of the axis of the lens element to permit the focusing of the lens element; an adjustable iris diaphragm device for the lens element; an indexing device adapted to indicate predetermined adjustments of the iris diaphragm device; and an indexing device for indicating predetermined focal adjustments of the lens element relatively to the support element including an index member movable independently of the lens and support elements, a scale device indicating predetermined positions between the support element and index member, and a second scale device indicating predetermined positions between the lens element and index member, one of said scale devices being adapted to translate the adjustments of said iris diaphragm device as indicated by said first mentioned indexing device to indicate predetermined positions of said index member relatively to one of said elements to indicate with the other scale device and said movable index member predetermined focal adjustments of the lens element in accordance with the indicated adjustments of the iris diaphragm device and the other scale device being adapted to indicate predetermined positions of the other of said elements with the index member to indicate with said one scale device and said movable index member predetermined focal adjustments of the lens element in accordance with the distance between objects to be focused and the support element.

6. A device of the nature described including a camera lens element; a support element therefor adapted to permit movement of the lens element relatively thereto longitudinally of the axis of the lens element to permit the focusing of the lens element; an adjustable iris diaphragm device for the lens element; an indexing device adapted to indicate predetermined adjustments of the iris diaphragm device; and an indexing device for indicating predetermined focal adjustments of the lens element relatively to the support element including an index member movable independently of the lens and support elements, a scale device indicating predetermined positions between the support element and index member, and a second scale device indicating predetermined positions between the lens element and index member, one of said scale devices being of the vernier type and being adapted to translate the adjustments of said iris diaphragm device as indicated by said first mentioned indexing device to indicate predetermined positions of said index member relatively to one of said elements to indicate with the other scale device and said movable index member predetermined focal adjustments of the lens element in accordance with the indicated adjustments of the iris diaphragm device and the other scale device being adapted to indicate predetermined positions of the other of said elements with the index member to indicate with said one scale device and said movable index member predetermined focal adjustments of the lens element in accordance with the distances between objects to be focused and the support element.

7. A device of the nature described including a camera lens element, a support element therefor, a screw thread device between the lens and support element adapted to effect adjusting movement of the lens element relatively to the support element longitudinally of the axis of the lens by relative rotation of the lens and support elements on the axis of the lens element to effect focusing thereof, an adjustable iris diaphragm device for the lens element, an indexing device adapted to indicate predetermined adjustments of the iris diaphragm device, and an indexing device for indicating predetermined focal adjustments of the lens element relatively to the support element including an index member pivotally mounted to be moved independently of the lens and support elements on the axis of the lens element and a scale device indicating predetermined adjustments between said index member and one of said elements, said index member being adapted to be positioned relatively to the other element in such independent movement in accordance with the adjustments of said diaphragm device to translate such adjustments to indicate with said scale device predetermined focal adjustments of the lens element in accordance with adjustments of the iris diaphragm device and said scale device being adapted to indicate with said adjusted positions of the index member predetermined focal adjustments of the lens element in accordance with the distances between objects to be focused and the support element.

8. A device of the nature described including a camera lens element; a support element therefor; a screw thread device between the lens and support elements adapted to effect adjusting movement of the lens element relatively to the support element longitudinally of the axis of the lens element by relative rotation of the lens and support elements on the axis of the lens element to effect focusing thereof; an adjustable iris diaphragm device for the lens element; an indexing device adapted to indicate predetermined adjustments of the iris diaphragm device; and an indexing device for indicating predetermined focal adjustments of the lens element relatively to the support element including an index member pivotally mounted to be moved independently of the lens and support elements on the axis of the lens element, a scale device indicating predetermined positions between the support element and index member, and a second scale device indicating predetermined positions between the lens element and index member, one of said scale devices being adapted to translate the adjustments of said iris diaphragm device as indicated by said first mentioned indexing device to indicate predetermined positions of said index member relatively to one of said elements to indicate with the other scale device and said movable index member predetermined focal adjustments of the lens element in accordance with the indicated adjustments of the iris diaphragm device and the other scale device being adapted to indicate predetermined positions of the other of said elements with the index member to indicate with said one scale device and movable index member predetermined focal adjustments of the lens element in accordance with the distances between objects to be focused and the support element.

9. A device of the nature described including a camera lens element; a support element therefor; a screw thread device between the lens and support elements adapted to effect adjusting movement of the lens element relatively to the support element longitudinally of the axis of the lens element by relative rotation of the lens and support elements on the axis of the lens element to effect focusing thereof; an adjustable iris diaphragm device for the lens element; an indexing device adapted to indicate predetermined adjustments of the iris diaphragm device; and an indexing device for indicating predetermined focal adjustments of the lens element relatively to the support element including an index member pivotally mounted to be moved independently of the lens and support elements on the axis of the lens element, a scale device indicating predetermined positions between the support element and index member, and a second scale device indicating predetermined positions between the lens element and index member, one of said scale devices being of the vernier type and being adapted to translate the adjustments of said iris diaphragm device as indicated by said first mentioned indexing device to indicate predetermined positions of said index member relatively to one of said elements to indicate with the other scale device and said movable index member predetermined focal adjustments of the lens element in accordance with the indicated adjustments of the iris diaphragm device and the other scale device being adapted to indicate predetermined positions of the other of said elements with the index member to indicate with said one scale device and movable index member predetermined focal adjustments of the lens element in accordance with the distances between objects to be focused and the support element.

10. A device of the nature described including a tubular support element; a second tubular support element extending within the same and having a screwthreaded engagement therewith to effect longitudinal adjustment of said tubular elements by relative rotation thereof, a camera lens mounted within the second tubular element and having its axis coincident with the axis of rotation of the same and to move therewith, an adjustable iris diaphragm device therefor, an index device adapted to indicate predetermined adjustments of the iris diaphragm device, and an indexing device for indicating predetermined adjustments of said second tubular element with said first mentioned tubular element to predetermine the focal adjustments of the lens and including an index member pivotally mounted on one of said tubular elements on the axis of said second tubular element and a scale device indicating predetermined adjustments between said index member and one of said tubular elements, said index member being adapted to be positioned relatively to the other tubular element in such independent movement in accordance with the adjustments of said iris diaphragm device to translate such adjustments to indicate with said scale device predetermined adjustments of the tubular members in effecting the focus of the lens in accordance with adjustments of the iris diaphragm device and said scale device being adapted to indicate with said adjusted positions of the index member predetermined focal adjustments of the lens in accordance with the distances between the objects to be focused and the first mentioned tubular member.

11. A device of the nature described including a tubular support element; a second tubular element extending within the same and having a screw-threaded engagement therewith to effect longitudinal adjustment of said tubular elements by relative rotation thereof; a camera lens mounted within the second tubular element and having the axis coincident with the axis of rotation of the same and to move therewith; an adjustable iris diaphragm device therefor; an index device adapted to indicate predetermined adjustments of the iris diaphragm device; and an indexing device for indicating predetermined adjustments of said second tubular member with said first mentioned tubular element to predetermine the focal adjustments of the lens and including a split resilient ring interlocked with one of said tubular elements in coaxial disposition therewith and adapted to be pivoted thereon, a scale device indicating predetermined positions between the support element and ring, and a second scale device indicating predetermined positions between said second tubular element and ring, one of said scale devices being adapted to translate the adjustments of said iris diaphragm device as indicated by said first mentioned indexing device to indicate predetermined positions of said ring relatively to one of said elements to indicate with the other scale device and said ring predetermined focal adjustments of the lens element in accordance with the indicated adjustments of the iris diaphragm device and the other scale device being adapted to indicate predetermined positions of the other of said elements with the ring to indicate with said one scale device and ring predetermined focal adjustments of the lens element in accordance with the distances between objects to be focused and the support element.

12. A device of the nature described including a tubular support element; a second tubular element extending within the same and supported therein for longitudinal adjustment therewith, said second tubular element extending beyond the forward end of said support element and having an externally enlarged portion at its forward end, said second element having its bore enlarged in such enlarged portion and having an opening formed in the rearwardly facing portion of said enlarged portion and communicating with the enlarged portion of the bore thereof; a camera lens mounted within the second tubular element and having its axis extending in parallelism with the axis thereof; an adjustable iris diaphragm device for the lens including a third tubular element disposed for limited rotation within the bore of said second tubular element and having an enlarged portion disposed within the enlarged portion of the bore of said second tubular element and forming a rearwardly facing shoulder visible through said opening of the second tubular element from a point rearwardly of the enlarged portion of the second tubular element; an index device adapted to indicate predetermined adjustments of said iris diaphragm device including a scale and cooperating mark one of which is placed on the enlarged portion of the second tubular element adjacent said opening thereof and the other of which is placed upon the surface of said enlarged portion of the third tubular element which is visible through said opening of the second tubular element in the relative movement thereof; and an indexing device for indicating predetermined longitudinal adjustments of the second tubular element with said tubular support element to predetermine the focal adjustments of the lens including a movably mounted index member disposed adjacent the front end of said tubular support element, a scale device indicating predetermined positions between the support element and index member, and a second scale device indicating predetermined positions between the second tubular element and the index member, one of these two last mentioned scale devices being of the vernier type and being adapted to translate the adjustments of said iris diaphragm device as indicated by said first mentioned indexing device to indicate predetermined positions of said index member relatively to one of said first and second mentioned tubular elements to indicate with the other of said two last mentioned scale devices and said movable index member predetermined adjustments of the lens in accordance with the indicated adjustments of the iris diaphragm device and the other of said two last mentioned scale devices being adapted to indicate predetermined positions of the other of said first and second mentioned tubular elements with the index member to indicate with said one scale device and movable index member predetermined focal adjustments of the lens in accordance with the distances between objects to be focused and the tubular support element.

In witness whereof I hereunto affix my signature this sixteenth day of September, 1920, A. D.

ALBERT S. HOWELL.